US012612803B2

(12) United States Patent
Riley et al.

(10) Patent No.: US 12,612,803 B2
(45) Date of Patent: Apr. 28, 2026

(54) ELECTRONIC LATCH RETRACTION FOR MORTISE LOCK AND METHODS OF OPERATION

(71) Applicant: ASSA ABLOY Access and Egress Hardware Group Inc., New Haven, CT (US)

(72) Inventors: Daniel Riley, Meriden, CT (US); Ian Sweeney, North Haven, CT (US)

(73) Assignee: ASSA ABLOY ACCESS AND EGRESS HARDWARE GROUP, INC., New Haven, CT (US)

( * ) Notice: Subject to any disclaimer, the term of this patent is extended or adjusted under 35 U.S.C. 154(b) by 112 days.

(21) Appl. No.: 18/238,813

(22) Filed: Aug. 28, 2023

(65) Prior Publication Data

US 2024/0068274 A1 Feb. 29, 2024

Related U.S. Application Data

(60) Provisional application No. 63/402,742, filed on Aug. 31, 2022.

(51) Int. Cl.
*E05B 47/00* (2006.01)
*E05B 63/08* (2006.01)

(52) U.S. Cl.
CPC .......... *E05B 47/0012* (2013.01); *E05B 63/08* (2013.01); *E05B 2047/0016* (2013.01)

(58) Field of Classification Search
CPC .. E05B 47/0012; E05B 63/08; E05B 47/0004; E05B 2047/0016; E05B 2047/0023; E05B 2047/0035; Y10T 292/1021
See application file for complete search history.

(56) References Cited

U.S. PATENT DOCUMENTS 3,890,608 A * 6/1975 Peterson ................. E05B 45/06 340/545.7
4,429,556 A * 2/1984 Kambic .............. E05B 47/0692 70/472
5,566,991 A * 10/1996 Young ................. E05B 47/0012 292/201

(Continued)

FOREIGN PATENT DOCUMENTS

DE 3521392 A * 12/1986 ......... E05B 47/0012
EP 284589 A * 9/1988 ......... E05B 47/0002

(Continued)

*Primary Examiner* — Alyson M Merlino
(74) *Attorney, Agent, or Firm* — DeLio Peterson & Curcio LLC; David R. Pegnataro

(57) ABSTRACT

A mortise lock and motor-assisted method of operating. The mortise lock comprises a case, a lever arm, a latch bolt having a linkage, a PCB having a controller and a microprocessor, and a motor assembly. An actuating element including a projection is disposed outside the motor assembly to move the latch bolt from the extended to retracted positions. The microprocessor is configured to detect a stall signal during the motor assembly's initial cycle operation indicating failure of a latch bolt retraction parameter. Upon detection of the stall signal, the controller causes the motor assembly to perform a second cycle operation to move the latch bolt from the extended position to the retracted position.

17 Claims, 11 Drawing Sheets

(56) References Cited

U.S. PATENT DOCUMENTS

| | | | | |
|---|---|---|---|---|
| 8,302,438 | B2 * | 11/2012 | Lui | E05B 47/0012 74/411 |
| 9,580,934 | B2 * | 2/2017 | Baty | E05B 47/0012 |
| 9,617,757 | B2 * | 4/2017 | Lowder | E05B 63/08 |
| 9,784,017 | B2 * | 10/2017 | Huang | E05B 63/08 |
| 10,508,470 | B2 * | 12/2019 | Raatikainen | E05B 47/0012 |
| 11,808,056 | B2 * | 11/2023 | Caterino | E05B 47/026 |
| 2012/0025984 | A1 * | 2/2012 | Lu | E05B 47/0657 340/542 |
| 2021/0047871 | A1 | 2/2021 | Riley | |
| 2021/0054655 | A1 * | 2/2021 | Cheng | E05B 63/08 |
| 2022/0381063 | A1 * | 12/2022 | Liao | E05B 47/0012 |
| 2023/0349196 | A1 * | 11/2023 | Lunday | E05B 63/08 |
| 2024/0102318 | A1 * | 3/2024 | Liao | E05B 47/026 |

FOREIGN PATENT DOCUMENTS

| | | | | |
|---|---|---|---|---|
| EP | 779402 | A1 * | 6/1997 | E05B 47/0002 |
| EP | 2594713 | A2 * | 5/2013 | E05B 15/101 |

* cited by examiner

FIG. 8A
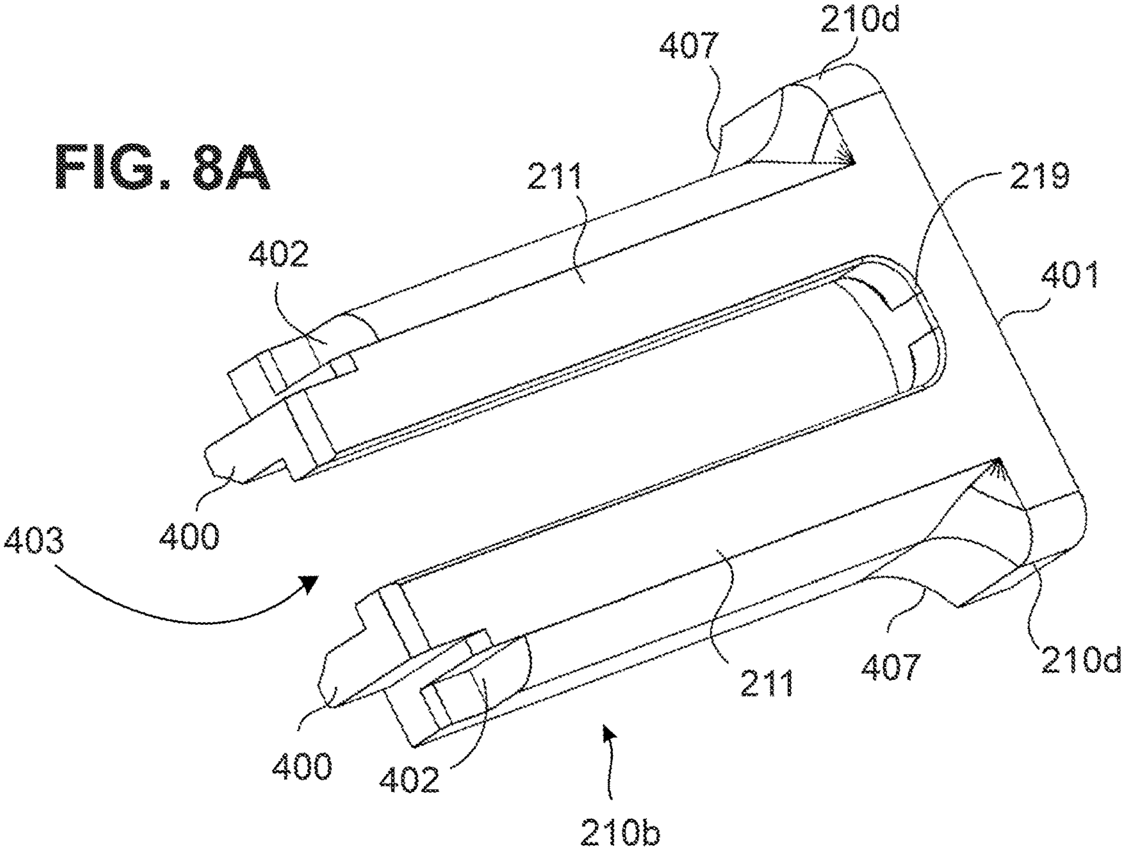
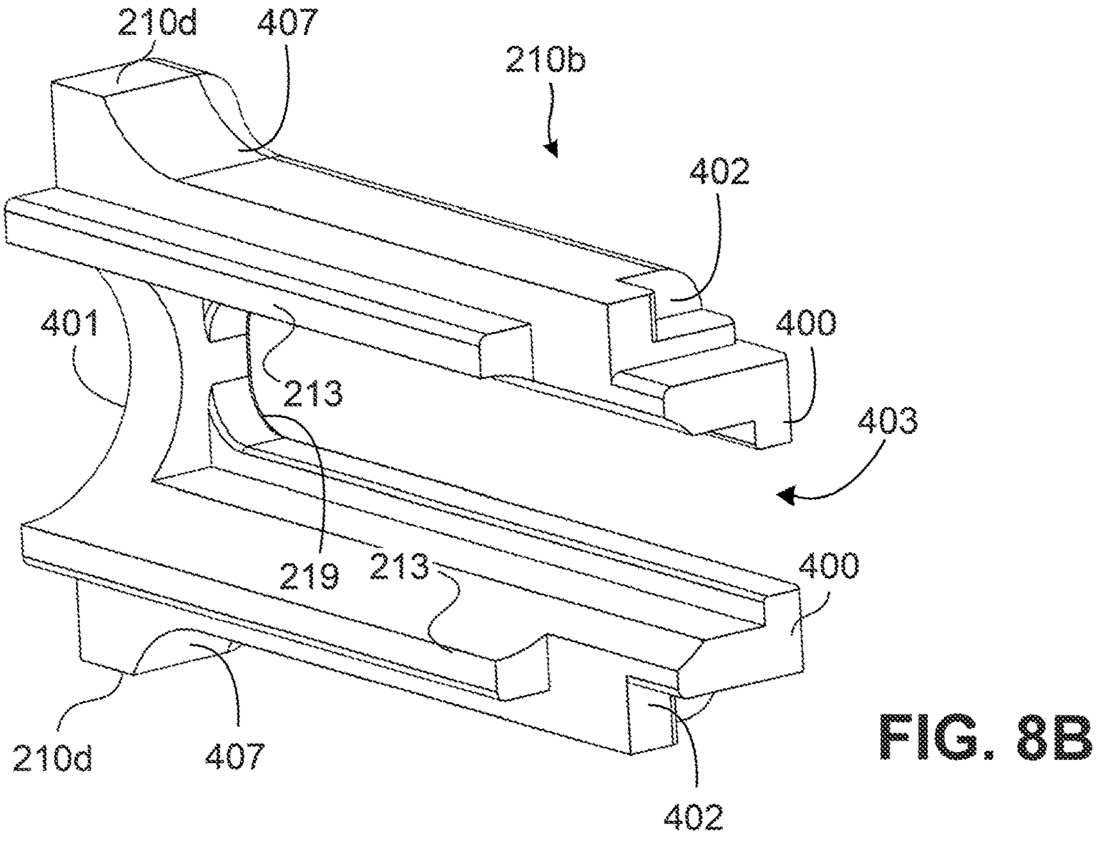
FIG. 8B

ELECTRONIC LATCH RETRACTION FOR MORTISE LOCK AND METHODS OF OPERATION

BACKGROUND OF THE INVENTION

1. Field of the Invention

The present invention relates to mortise locks, and more particularly, to motor-driven latch assemblies for use in mortise locks.

2. Description of the Related Art

A mortise lock is designed to fit into a mortised recess formed in the edge of a door. The mortise lock generally includes a housing, or case, which encloses the lock components. One component of a mortise lock is a latch bolt that is movable in the case between an extended position and a retracted position. In the extended position, a bolt head projects outside of the case and beyond the edge of the door and into an opening or strike in the door frame to latch the door in a closed position. In the retracted position, the bolt head is retracted into the case to permit opening of the door. The latch bolt may be moved between the extended and retracted positions mechanically by operation of a latch operator, such as a door knob or lever handle, or electronically, such as by sending a signal to an electric motor to actuate the latch bolt.

Stepper motors are advantageous in electrical door designs as they are digital input-output devices for precision starting and stopping operations. Unlike standard electric motors, stepper motors are constructed so that current passes through a series of coils arranged in phases that can be powered on and off in quick sequence. This allows the motor to turn through a fraction of a rotation at a time, often referred to as a "step." Stepper motors convert pulsing electrical current, controlled by a stepper motor driver, into precise one-step movements of a gear-like toothed component around a central shaft. This allows the stepper motor to complete full or partial turns as required, including abrupt stopping at any of the steps around its rotation. Thus, stepper motors are commonly used in holding applications, due to their ability to assert clearly defined rotational positions, speeds, and torques as required.

Conventional stepper motor linear actuators are designed to be loaded axially. Problems arise when these actuators encounter an offset load. This results in excessive wear, reduced efficiency and premature failure. Typically, motors need to be offset from the centerline of the latch bolt within a mortise lock to avoid interference. However, this in turn creates side loading forces which add additional load to the latch and in turn the motor, which can cause premature failure. Sealing gaskets within a door frame and pressure differentials of Heating, Ventilation, and Air Conditioning (HVAC) systems cause doors to be loaded in the direction of opening, resulting in loading on the latch bolt which causes an increased amount of force needed to retract the latch bolt. Quick retraction of the latch bolt within an electrical latch actuating system is paramount to prevent a door operator from pulling the door open before the latch bolt is retracted, and additional loading can inhibit successful operations of the latch bolt. In addition, conventional linear actuators are often large and cumbersome to incorporate within a mortise lock, causing further issues with the operation of the latch bolt.

Thus, a need exists for an improved motor assembly which can more easily be housed within a mortise lock to produce an electrical latch actuating system which can ensure proper retraction regardless of any sideloading or loading forces on the latch bolt, and can also detect a stall condition and apply additional force at slower speed to retract the latch and overcome the stall condition.

SUMMARY OF THE INVENTION

Bearing in mind the problems and deficiencies of the prior art, it is therefore an object of the present invention to provide a motor assembly which may accommodate offset loads while maximizing efficiency and wear resistance.

Further, an object of the present invention is to provide a motor assembly which produces a smaller footprint within a mortise lock.

It is another object of the present invention to provide a latching mechanism that is driven to overcome performance issues due to offset loading.

A further object of the invention is to provide a method and system for controlling the operation of latch actuators and the power applied thereby to latching mechanisms, at different steps of the actuation process.

Still other objects and advantages of the invention will in part be obvious and will in part be apparent from the specification.

The above and other objects, which will be apparent to those skilled in the art, are achieved in the present invention which is directed to a motor assembly for mortise lock including a PCB comprising a controller and a microprocessor, the motor assembly comprising: a motor; a shaft translatable within the motor; an actuation housing forming a channel therein; and an actuating element secured to an end of the shaft and moveable within the actuation housing channel. The actuating element may include a projection disposed outside the actuation housing and extending normal to a longitudinal axis of the shaft. The motor assembly may be configured to initiate an initial cycle operation upon receipt of a power signal from the PCB, the initial cycle operation capable of moving a latch bolt from an extended position to a retracted position wherein a first portion of the latch bolt remains inside a mortise lock case. The initial cycle operation may comprise a motor speed of about 1310 PPS and current of about 700 mA. The actuating element may be offset from the motor assembly shaft and coplanar to the lever arm, and the actuation housing may comprise a lower housing member and an upper housing member, the lower housing member having a coupling element for engagement with a coupling end of the upper housing member. The motor assembly may comprise a guide member secured to the shaft end and in slidable engagement with the actuation housing channel. The microprocessor is configured to detect a stall signal as the motor assembly performs the initial cycle operation, the stall signal indicating failure of a latch bolt retraction parameter, the latch bolt retraction parameter comprising one or more of the following: a latch bolt projection length, a number of motor assembly pulses per second, a current range of about 700 mA to about 1 A, a percentage of total motor assembly steps completed, and a predetermined latch bolt retraction speed. Upon detection of the stall signal the controller may cause the motor assembly to perform a second cycle operation to move the latch bolt from the extended position to the retracted position. The second cycle operation may comprise a motor speed less than a motor speed of the initial cycle operation and an electrical current greater than an electrical current of the initial cycle operation.

In another aspect, an object of the present invention is to provide a method of actuating a motor-assisted mortise lock, comprising identifying, by microprocessor, a number of incremental positions remaining in an initial cycle operation of a motor assembly if a stall signal is detected during the initial cycle operation indicating failure of a latch bolt retraction parameter, initiating, by controller, a second cycle operation of the motor assembly for the number of incremental positions remaining to move a latch bolt from extended to retracted positions within the latch bolt retraction parameter, and applying a holding current to the motor assembly to maintain the latch bolt in the retracted position. The second cycle operation of the motor assembly may comprise a motor speed less than a motor speed of the initial cycle operation and an electrical current greater than an electrical current of the initial cycle operation. Failure of the latch bolt retraction parameter may be due to sideloading or loading forces on the latch bolt. Prior to identifying the number of incremental positions remaining, the method may comprise supplying a PCB of the mortise lock with a power signal, the PCB comprising the microprocessor and the controller, sending the power signal to the motor assembly initiating the initial cycle operation of the motor assembly to retract the latch bolt, and monitoring, by microprocessor, the initial cycle operation to detect the stall signal indicating failure of the latch bolt retraction parameter.

In yet another aspect, an object of the present invention is to provide a method of operating a motor-assisted mortise lock comprising supplying a PCB of the mortise lock with a power signal, sending the power signal to a motor assembly of the mortise lock, initiating an initial cycle operation of the motor assembly to move a latch bolt of the mortise lock from an extended position to a retracted position, monitoring, by microprocessor, the initial cycle operation to detect a stall signal indicating failure of a latch bolt retraction parameter, moving the latch bolt from extended to retracted position within the latch bolt retraction parameter, and applying a hold current to the motor assembly to maintain the latch bolt in the retracted position. Prior to moving the latch bolt from extended to retracted position, the method may comprise detecting, by microprocessor, a stall signal as the motor assembly performs the initial cycle operation, the stall signal indicating failure of the latch bolt retraction parameter, determining, by microprocessor, a number of incremental positions remaining in the initial cycle operation, and initiating a second cycle operation of the motor assembly for the number of incremental positions remaining.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 8A depicts a perspective view of a portion of the motor assembly of FIG. 5;

FIG. 8B depicts a perspective view of a portion of the motor assembly of FIG. 5;

DETAILED DESCRIPTION OF THE INVENTION

Figure 1:
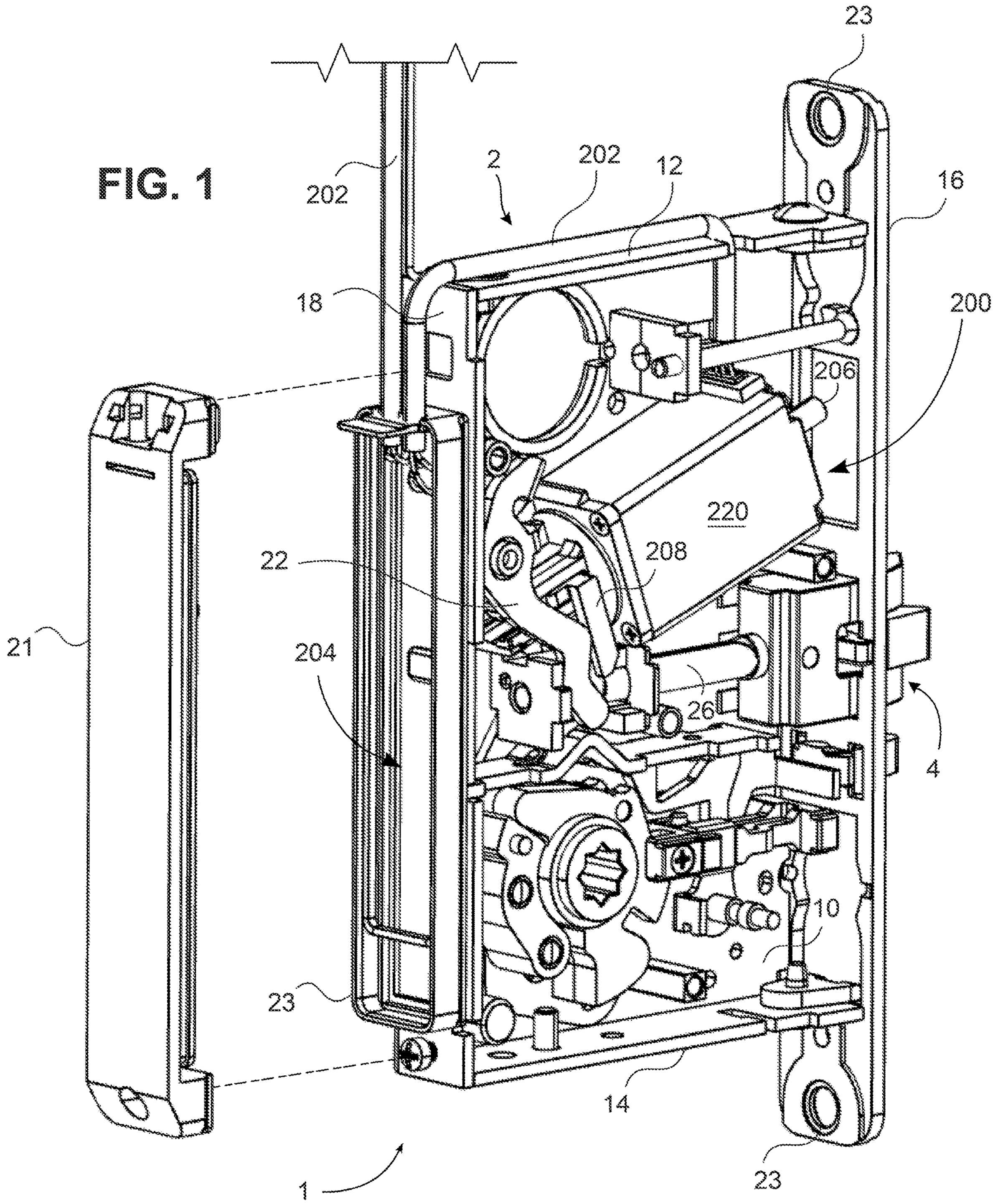
FIG. 1 depicts a perspective view of a mortise lock assembly according to one embodiment of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the singular forms "a", "an" and "the" are intended to include the plural forms as well, unless the context clearly indicates otherwise. Also, as used herein, the term "and/or" includes any and all combinations of one or more of the associated listed items. It will be further understood that the terms "include" and/or "including" when used herein, specify the presence of stated features, steps, operations, elements, and/or components, but do not preclude the presence or addition of one or more other features, steps, operations, elements, components, and/or groups thereof.

Relative terms such as "below," "above," "upper," "lower," "horizontal," "vertical," "top," "bottom," "rear," "front," "side," or the like may be used herein to describe a relationship of one element or component to another element or component as illustrated in the figures. It will be understood that these terms are intended to encompass different orientations of the device in addition to the orientation depicted in the figures.

Additionally, in the subject description, the words "exemplary," "illustrative," or the like are used to mean serving as an example, instance or illustration. Any aspect or design described herein as "exemplary" or "illustrative" is not necessarily intended to be construed as preferred or advantageous over other aspects or design. Rather, use of the words "exemplary" or "illustrative" is merely intended to present concepts in a concrete fashion.

FIGS. 1-11 illustrate various embodiments of the mortise lock of the present invention. While the one or more embodiments of the invention are illustrated with respect to certain features of the mortise lock, it should be understood that any of the embodiments and/or features thereof illustrated with respect to one embodiment may be utilized with any of the other embodiments and/or features thereof. Similarly, while the present invention is directed to mortise locks utilizing stepper motors, different types of locks and electric motors are not meant to be precluded, and the present invention is meant to embrace such alternatives.

FIG. 1 depicts a perspective view of a mortise lock assembly according to one embodiment of the present invention. Mortise lock 1 is shown comprising a case 2 and a latch bolt 4. The case 2 houses the lock components and is configured and dimensioned to be received in a mortise in a free, or non-hinged, edge of a door. One of the side walls of the case 2 may comprise a removable cap (not shown) which is releasably coupled to the remainder of the case 2, such as by fasteners, and forms a closure for allowing access to the interior of the case 2. The case 2 includes a side wall 10 opposite to the cap and a top wall 12, bottom wall 14, front wall 16 and rear wall 18. Lever arm 22, located within the case 2 interior, is normally biased in a position away from rear wall 18 by resilient member or return spring (not shown). The front wall 16 has an opening through which latch bolt 4 extends and retracts (See FIGS. 2-4). The front wall 16 may also include other openings for housing components such as a deadbolt, an auxiliary bolt, a toggle, and the like. A face plate may be secured to the front wall 16 of case 2 and has openings which correspond to the openings in the front wall 16. The face plate and/or front wall 16 may include apertures 23 for receiving fasteners for securing the mortise lock 1 in a door.

Figure 3:
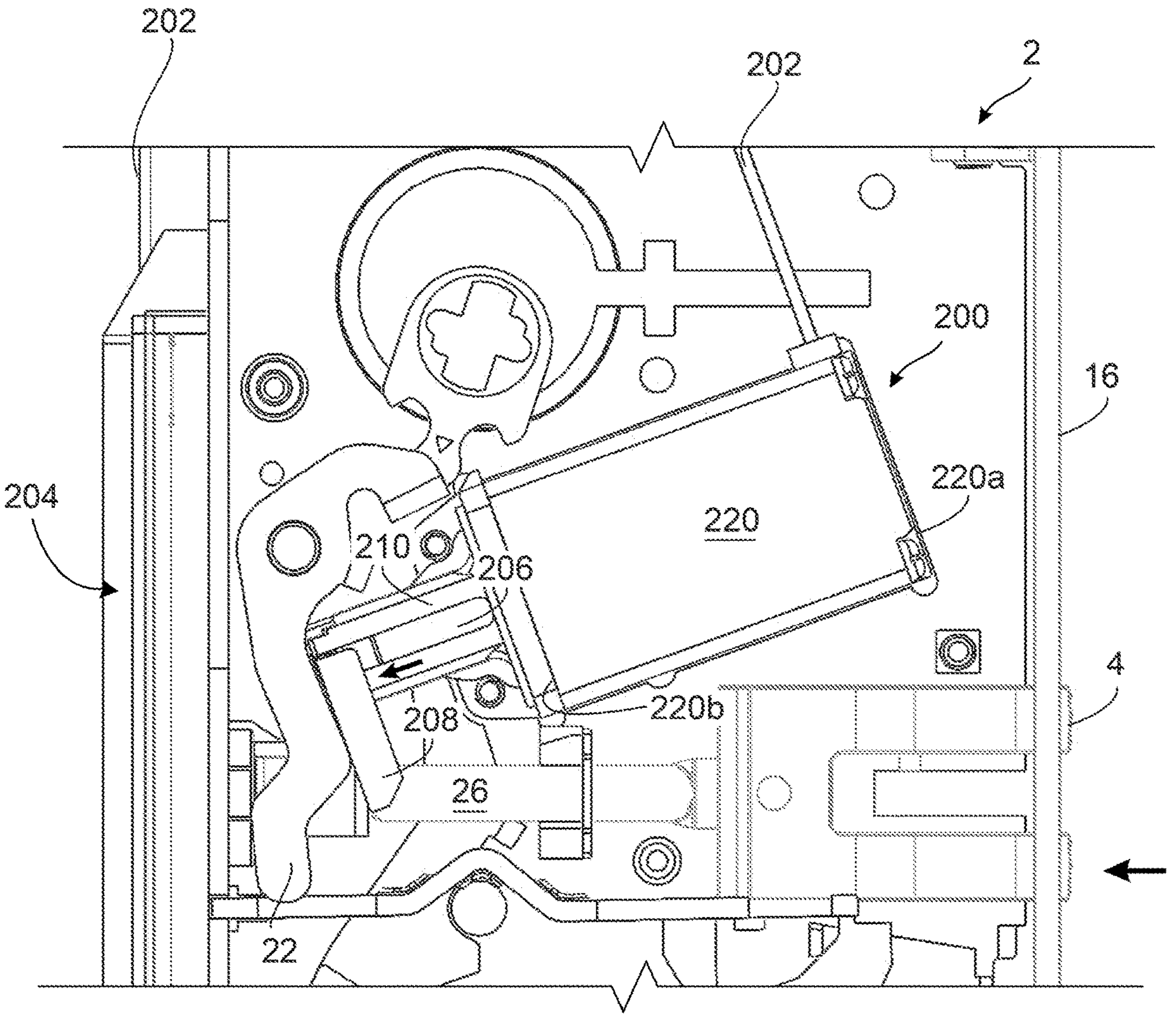
FIG. 3 depicts a side view of a portion of the mortise lock assembly according to one embodiment of the present invention, displaying the latch bolt in the retracted position.

A motor assembly 200, such as a linear drive actuator, may drive lever arm 22 towards and away from the rear wall 18 during actuation operations, which in turn moves linkage 26 connected to latch bolt 4 to cause latch bolt 4 to move between an extended position (FIG. 4) and a retracted position (FIG. 3). A printed circuit board (PCB) 204 may be received within a PCB housing 23 disposed on rear wall 18, or anywhere else on the mortise lock case 2. Electrical connections 202 are shown connecting the PCB 204 to the motor assembly 200. Wireless connections by conventional means may be alternatively employed. A removable housing endcap 21 forms a closure for allowing access to the interior PCB housing 23.

A controller is provided on PCB 204 for operating the latch bolt 4 between extended and retracted positions, and PCB 204 may include a microprocessor to effect power regulation to the motor assembly actuator. The microprocessor may be configured to receive a stall detection signal and can operate the motor assembly 200, whether it is motor driven by continuous current or a pulse, or solenoid driven by a solenoid-type power signal. Due to the resilient member or return spring (not shown), the latch bolt will fail secure upon power termination, but the mortise lock may be configured to fail safe in alternate embodiments of the invention.

Figure 2:
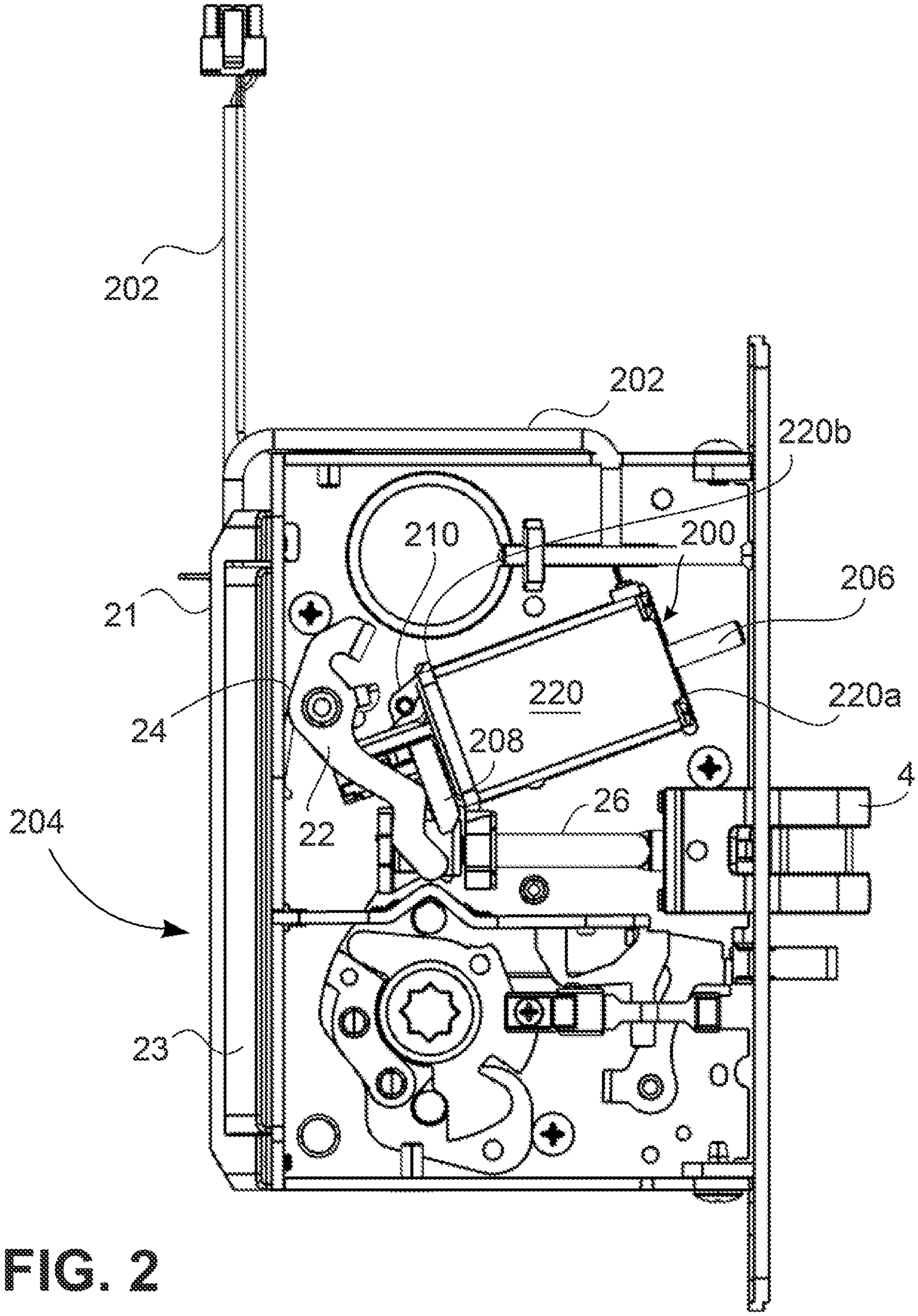
FIG. 2 depicts a side view of a mortise lock assembly according to one embodiment of the present invention.
Figure 4:
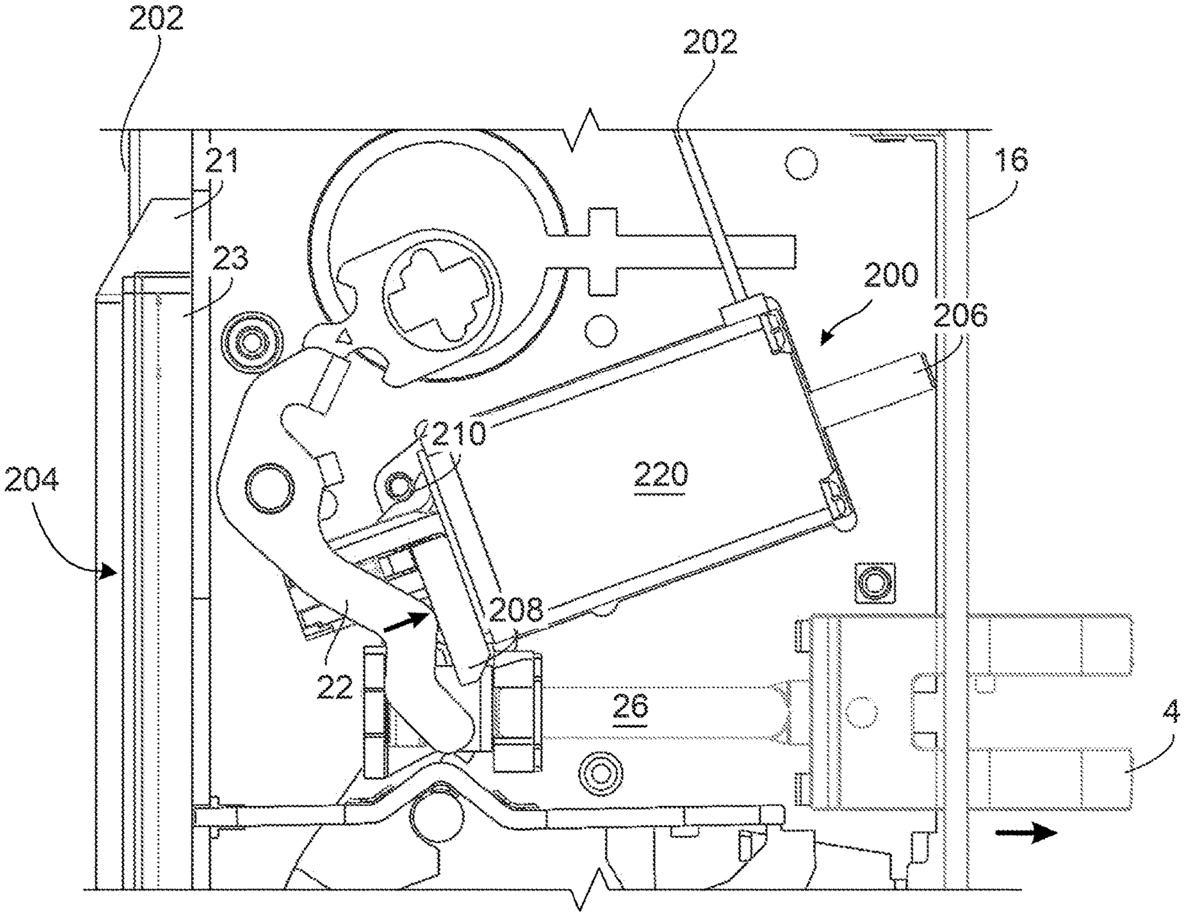
FIG. 4 depicts a side view of a portion of the mortise lock assembly according to one embodiment of the present invention, displaying the latch bolt in the extended position.

Actuation of the motor assembly and latch bolt may be seen in connection with FIGS. 2-4. FIGS. 2 and 4 depict latch bolt 4 in the extended position, where a substantial portion of the latch bolt projects from the case 2 via one or more openings in front wall 16. Conversely, FIG. 3 depicts the latch bolt 4 in a retracted position, where a substantial portion of the latch bolt 4 remains in the interior of case 2. In the extended position, latch bolt 4 extends through the case 2 and beyond the edge of the door (not shown) in which the mortise lock 1 is secured. When the door is in a closed position, latch bolt 4 will extend within a strike or door frame (not shown) to hold the door in the closed position. Latch bolt 4 may be locked in this position to prevent retraction of the latch bolt from the strike or door frame.

FIGS. 2 and 4 depict side views of the mortise lock assembly according to one embodiment of the present invention, displaying the latch bolt in the extended position prior to actuation of the motor assembly. Motor shaft 206 is seen in a first position extending from the forward end 220*a* of the motor 220 towards front wall 16. An actuating element 208 is secured to motor shaft 206 at the motor rearward end 220*b* extending outwardly from an actuating housing 210 of the motor assembly. Actuating element 208 is disposed coplanar to lever arm 22 and offset from motor shaft 206 such that actuating element 208 engages lever arm 22 during operation of the motor assembly 200. In the first position, actuating element 208 is adjacent motor rearward end 220*b* such that lever arm 22 remains in the biased position away from rear wall 18, such that linkage arm 26 and latch bolt 4 are in the extended position. Upon signal from the PCB 204, the motor 220 translates shaft 206 from the first position to the second position shown in FIG. 3.

FIG. 3 depicts a side view of a portion of the mortise lock assembly according to one embodiment of the present invention, displaying the latch bolt in the retracted position after actuation of the motor assembly. Motor assembly 200 is depicted in the second position with shaft 206 and actuating element 208 extending from the motor rearward end 220*b* towards rear wall 18. Motor 220 causes shaft 206 to translate from the first position to the second position, causing retraction of the latch bolt 4, which is depicted extending within the case 2. As shaft 206 begins to extend towards rear wall 18, actuating element 208 will engage lever arm 22, overcoming the biasing force of the resilient member (not shown) and pivots, rotates, or otherwise moves lever arm 22 towards rear wall 18. Movement of lever arm 22 effects the translation of linkage 26 towards rear wall 18, effecting retraction of latch bolt 4 within the case interior. A predetermined amount of electrical current may be supplied to the motor assembly 200 to maintain the latch bolt 4 in the retracted position (e.g., a current of 50 mA), which can be held for any predetermined amount of time without causing overload or damage to the motor assembly. To ensure proper latch bolt retraction parameters, a microprocessor of PCB 204 may determine if a stall is detected within the motor assembly 200 which would affect actuation speeds of the latch bolt. The latch bolt retraction parameters may comprise a latch bolt projection from the case of >0.1 in-<1.0 in (preferably 0.75 in), motor assembly pulses per second (PPS) of 655 PPS-1310 PPS, a current of 700 mA-1 A, about 25% to 100% the number of motor steps, latch bolt retraction speeds of 0.5 sec-1.0 sec, and combinations thereof. Upon detection of a stall, the microprocessor may initiate a higher force operation on the motor as described below.

Upon termination of current to the motor assembly 200, the biasing force of the resilient member 24 will exceed any holding force on lever arm 22 supplied by actuating element 208. The lever arm 22 will subsequently move to a forward position away from rear wall 18, causing translation of the actuating element 208 and motor shaft 206 to the first position (FIG. 4), and the movement of the latch bolt 4 to the extended position via movement of linkage arm 26.

Figure 5:
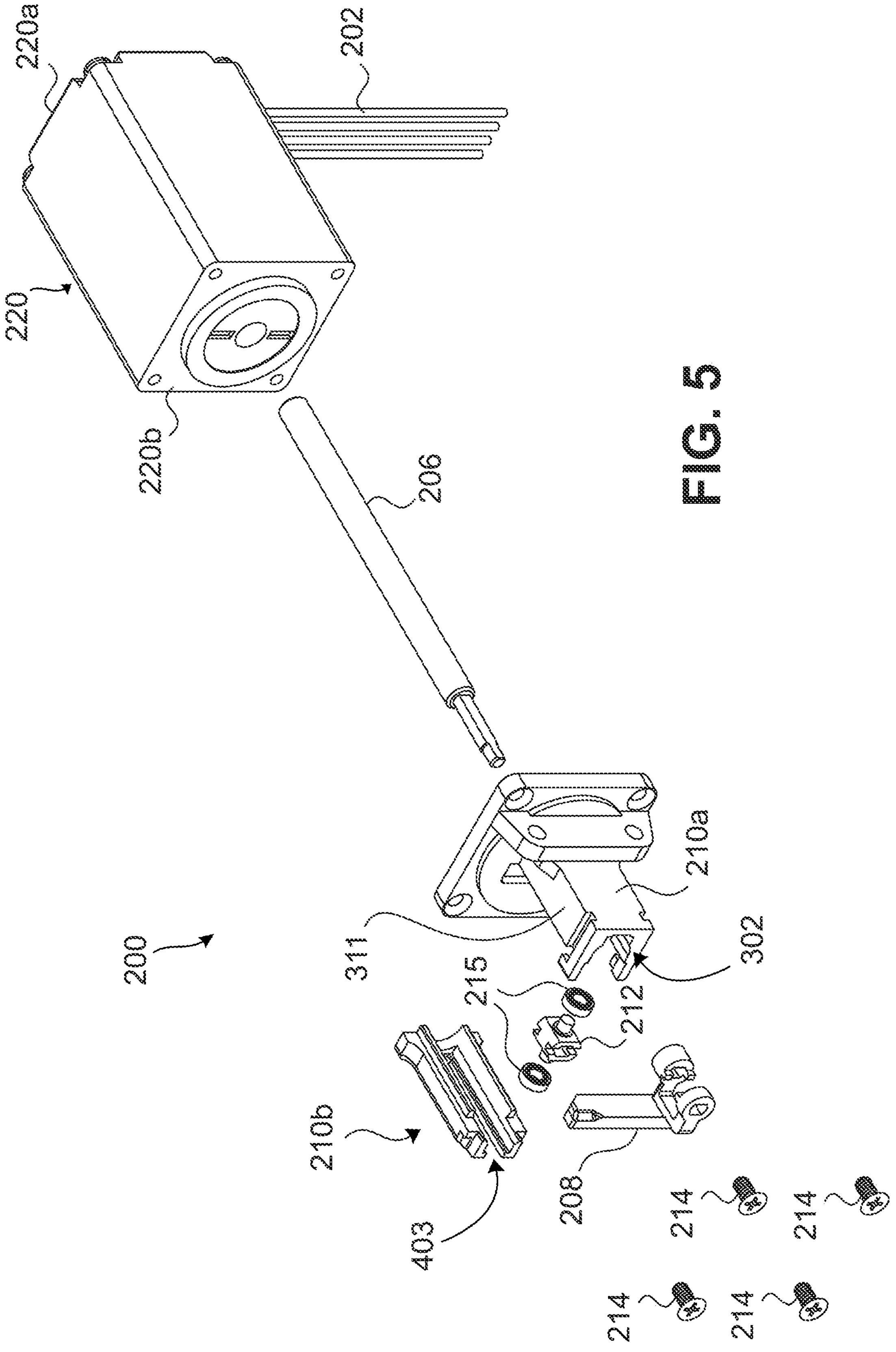
FIG. 5 depicts an exploded perspective view of a door motor assembly according to one embodiment of the present invention.
Figure 6:
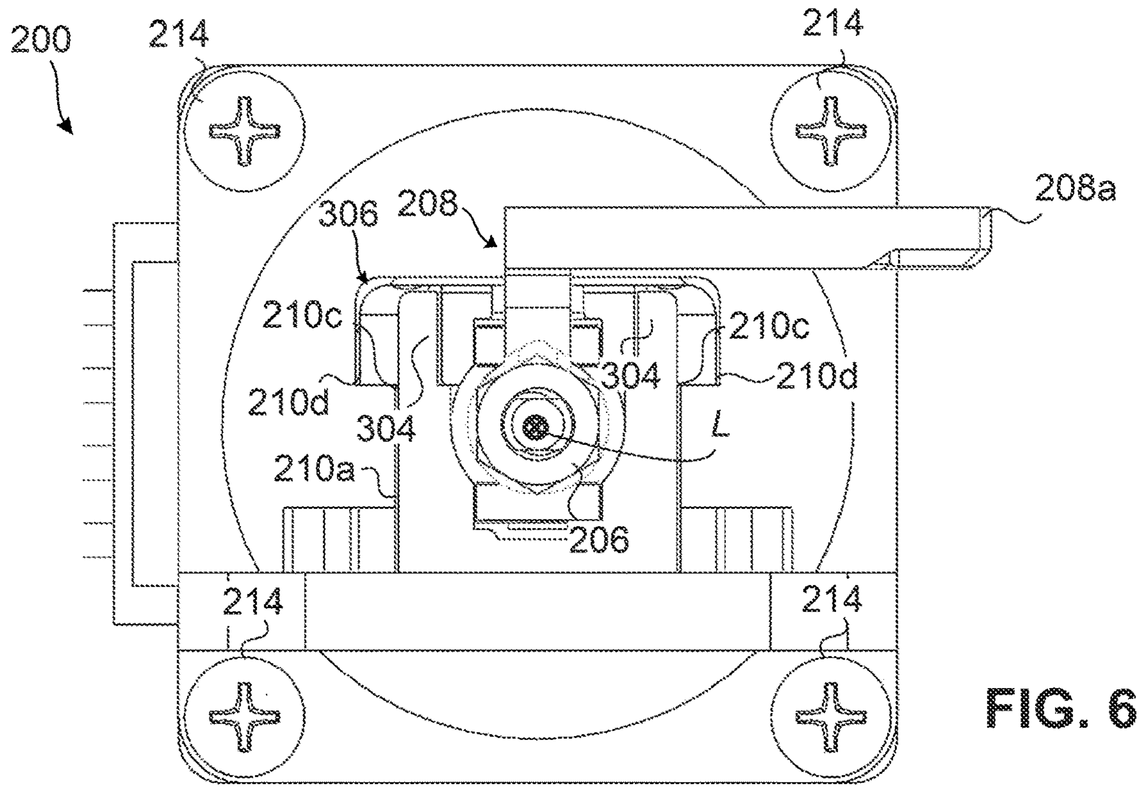
FIG. 6 depicts a front view of a motor assembly according to one embodiment of the present invention.

FIGS. 5 and 6 depicts an exploded perspective and side views of a door motor assembly according to one embodiment of the present invention. Motor assembly 200 comprises a motor 220 having a motor shaft 206 approximately coaxial with a central axis L of motor 220 for translational movement between the forward motor end 220*a* and rearward motor end 220*b*. Motor assembly 200 may further include an actuation housing 210 comprising a lower housing member 210*a* which may be secured to the motor 220 via fasteners 214 or similar methods and an upper housing member 210*b*. Lower housing member 210*a* includes a generally U-shaped projecting portion having a base portion (not shown) connecting sidewalls 210*c* forming a channel 302 therebetween. Coupling element(s) 304 of the lower housing member 210*a* are sized to fit within and engage coupling end (not shown) of the upper housing member 210*b* during assembly. A flange 210*d* on the upper housing member 210*b* may fit within and engage opening 306 of the lower housing member 210*a* in an interference and/or transition engagement during assembly to prevent shifting between the upper housing member and lower housing member.

A guide member 212 having one or more bearings 215 is received within the channel/track 302, 403 formed between lower housing member 210*a* and upper housing member 210*b*. During assembly, upper housing member 210*b* will be received by the lower housing member 210*a*, enclosing the guide member 212 within housing channels/tracks 303, 403 in sliding engagement. Guide member 212 is secured to an end of the motor shaft 206 to prevent rotation of shaft 206 within motor 220, ensuring linear translation within channel/track 302, 403. Actuating element 208 comprises a linear projection 208*a* extending perpendicular to shaft central axis L and may be secured to shaft 206 and/or bearing guide 212 along receiving portion 208*b*, which may include openings which receive shaft 206. Linear translation of shaft 206 will in turn provide movement of actuating element 208, causing linear projection 208*a* to apply a force to lever arm 22 which in turn effects movement of latch bolt 4. Guide member 212 is capable of absorbing offset loads resulting from movement of actuating element 208 to reduce excessive wear on the motor assembly 200, which can reduce operational inefficiencies and/or premature failure.

Figure 7:
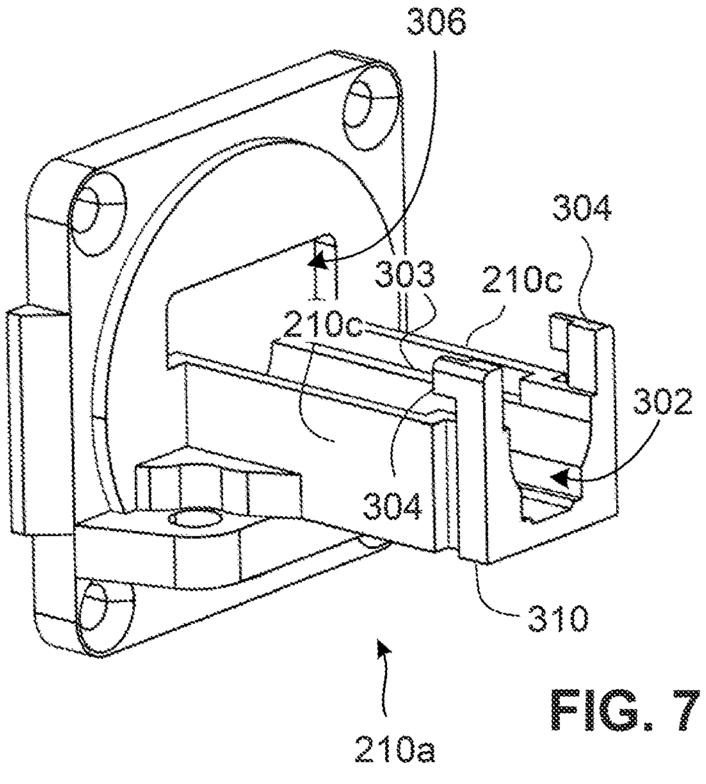
FIG. 7 depicts a perspective view of a portion of the motor assembly of FIG. 5.

FIG. 7 depicts a perspective view of a portion of a door motor assembly according to one embodiment of the invention. Lower housing member 210*a* may be secured to the motor via fasteners (not shown) or similar methods. Lower housing member 210*a* includes a generally U-shaped track projection having a base portion 310 connecting sidewalls 210*c* forming a channel 302 therebetween. During assembly, lower housing shelf 303 will receive upper housing member sidewalls (not shown), enclosing the guide member (not shown) within channel/track 302. Coupling element(s) 304 of the lower housing member 210*a* fit within and engage coupling end (not shown) of the upper housing member 210*b* during assembly. An opening 306 of the lower housing member 210*a* may receive a flange of the upper housing member (not shown) in an interference and/or transition engagement during assembly to prevent shifting between the upper housing member and lower housing member.

FIGS. 8A and 8B depict perspective views of a portion of a door motor assembly according to one embodiment of the present invention. Upper housing member 210*b* has a middle body component 211 extending from forward end 401 rearward to a lower housing engagement end 400. The middle body component 211 may be formed with coupling end 402 formed on engagement end 400. The forward end 401 has a shoulder 407 forming flange(s) 210*d*. A slot 219 is cut within the middle body component 211 to receive the actuating element projection 208*a* during assembly (See FIGS. 9A, 9B). Coupling end 402 fits about and engages coupling element(s) of the lower housing member (See FIG. 7) during assembly. Flange 210*d* may fit within and engage the lower housing opening (See FIG. 7) during assembly in an interference and/or transition engagement to prevent shifting between the upper housing member and lower housing member 210*a*. A channel/track 403 extends between engagement end 400 and forward end 401 to provide an engagement surface with the guide member (See FIG. 5), and is surrounded by sidewalls 213. During assembly, upper housing member sidewalls 213 will be received by the lower housing shelf (See FIG. 7), enclosing the guide member within channel/track 403.

Figure 9A:
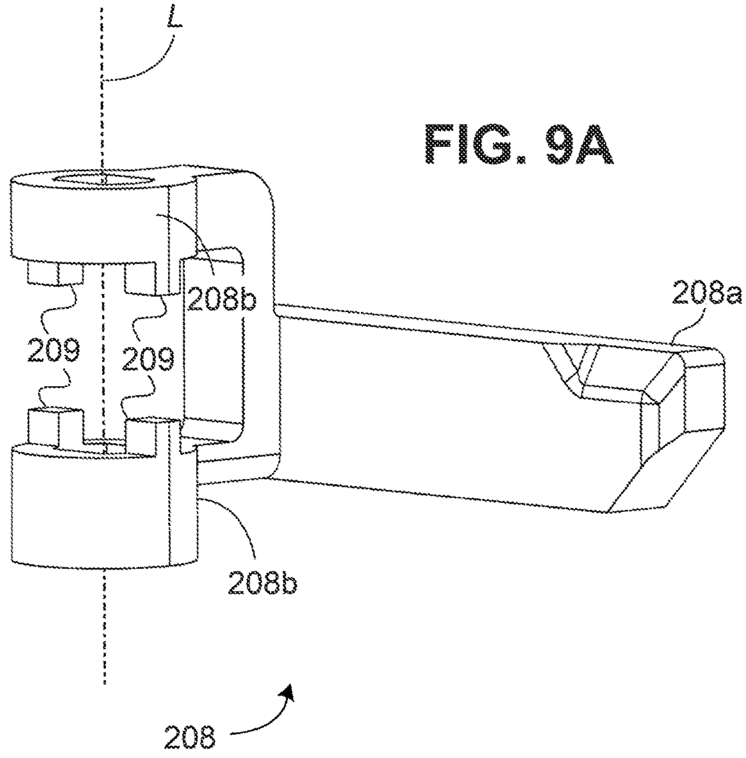
FIG. 9A depicts a perspective view of an actuating element of the motor assembly of FIG. 5.
Figure 9B:
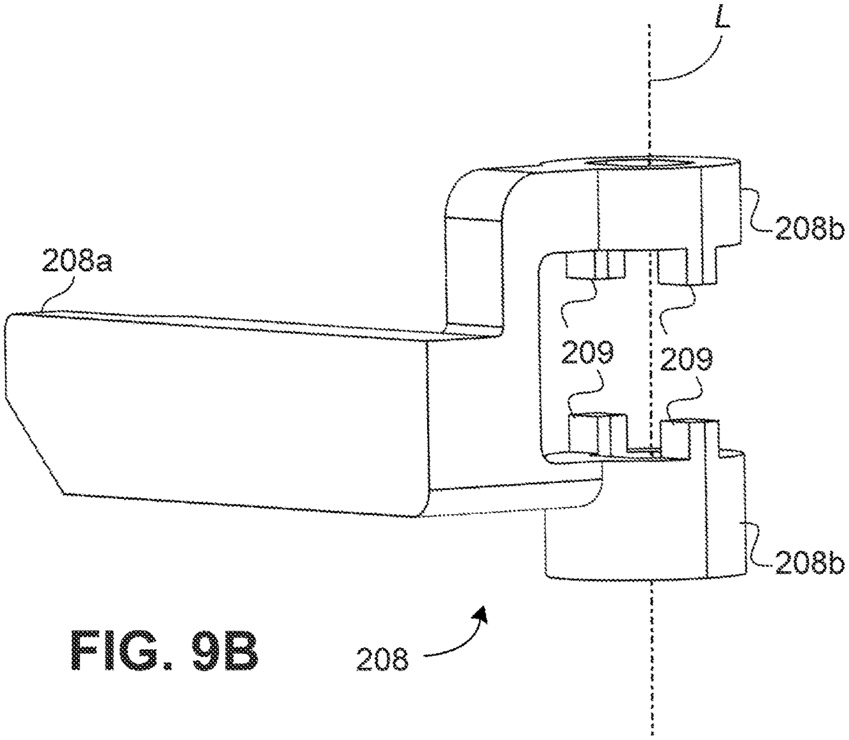
FIG. 9B depicts a perspective view of the actuating element of FIG. 9A.

FIGS. 9A and 9B depict perspective views of an actuating element of a motor assembly according to one embodiment of the invention. Actuating element 208 comprises a linear projection 208*a* extending from a receiving portion 208*b*. One or more pawls 209 extend from receiving portion 208*a* to an interior portion of the actuating element 208. Pawl(s) 209 fit within and engage the guide member (See FIG. 5), ensuring reciprocal movement of actuating element with guide member and shaft (See FIG. 5) during operation. After assembly, projection 208*a* will extend perpendicularly from the motor assembly by way of the lower housing member slot (See FIG. 5). The motor assembly shaft receives actuating element via one or more openings of receiving portion 208*a* along the shaft central axis L. Actuating element 208 is configured to engage lever arm (See FIG. 3) and operation of the motor assembly will cause projection 208*a* to urge lever arm to a position effecting movement of the latch bolt between extended and retracted positions.

Figure 10A:
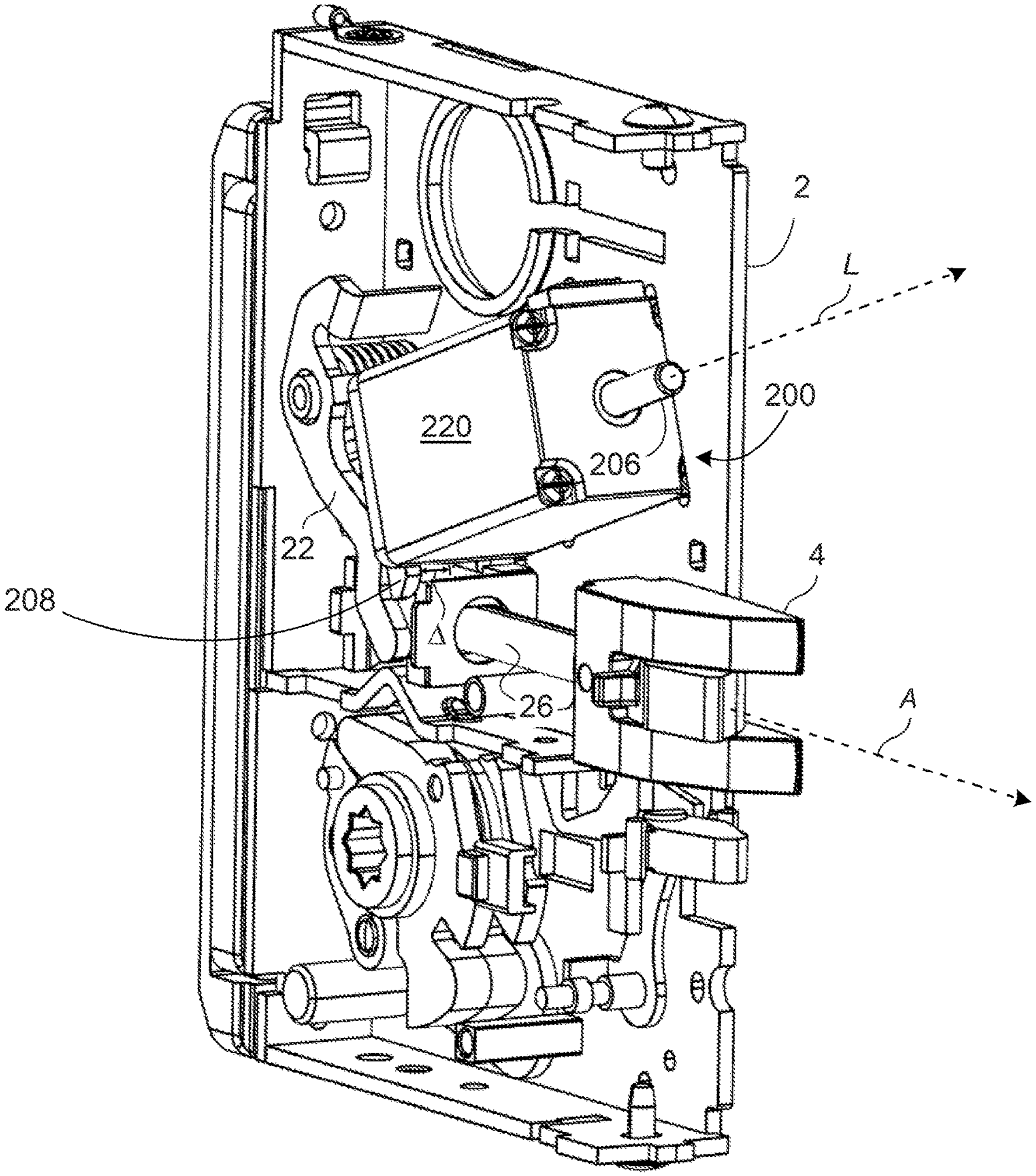
FIG. 10A depicts a perspective view of a mortise lock assembly according to one embodiment of the present invention, displaying the offset loading.
Figure 10B:
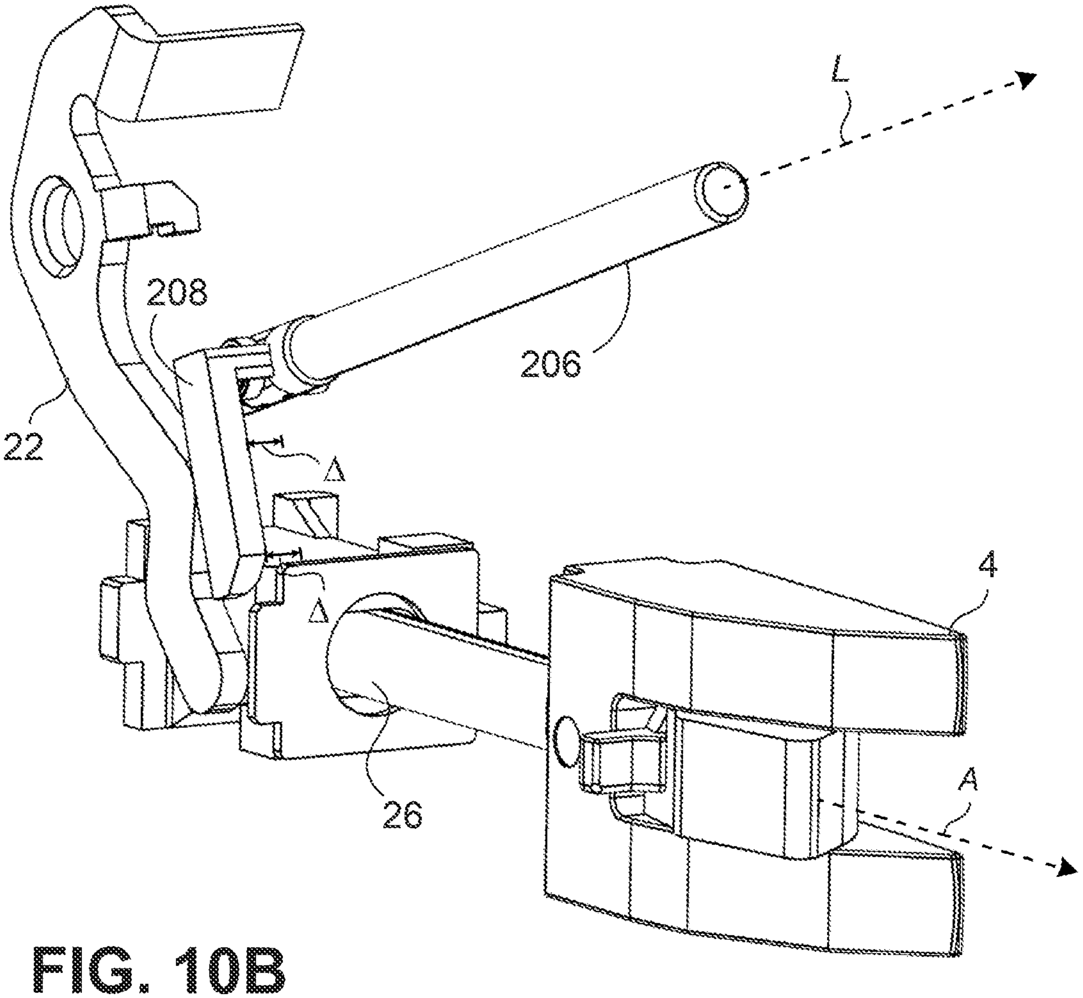
FIG. 10B depicts a perspective view of a portion of the mortise lock assembly of FIG. 10A, displaying the offset loading.

FIGS. 10A and 10B depict perspective views of at least a portion of a mortise lock assembly according to one embodiment of the present invention, displaying an example of offset loading. The motor assembly of the present invention overcomes the deficiencies of the prior art through a method of detecting a stall condition within the mortise lock described in detail as presented below. The motor assembly 200 is disposed within case 2 such that the longitudinal axis L of motor shaft 206 is eccentric to the longitudinal axis A of linkage arm 26 and latch bolt 4, but may be configured to be parallel or substantially parallel axes in alternate embodiments of the invention. Due to the configuration of case 2, motor assembly 200 is offset from lever arm 22 a distance A, producing offset loading on the motor assembly 200, and particularly actuating element 208, during actuation operations. In addition, high forces in the direction of door opening ("warped door" forces) as a result of sealing gaskets within a door frame and pressure differentials from HVAC systems require significantly higher latch bolt retraction forces than the majority of opening operations. Advantageously, the present invention comprises a method of detecting a stall condition which can provide a plurality of actuation procedures to the motor assembly 200 depending on the conditions detected therein, such as a first cycle at typical forces and, if a stall is detected, a second cycle at higher current/force can be initiated to overcome the stall condition within predetermined latch bolt retraction parameters.

Figure 11:
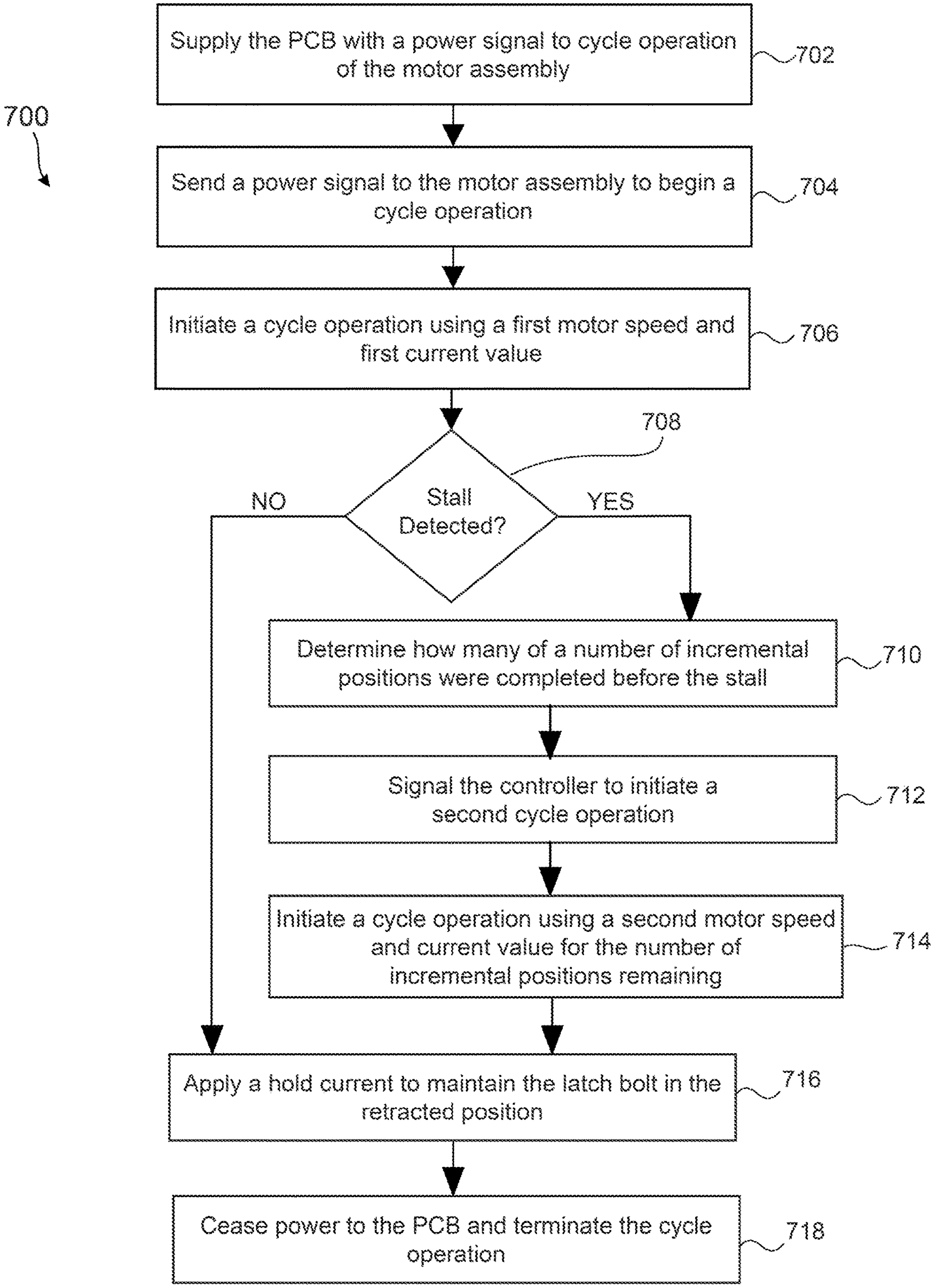
FIG. 11 depicts a flow diagram of an example method of operating a mortise lock assembly according to one embodiment of the present invention.

FIG. 11 depicts a flow chart diagram for use with one or more embodiments of the present invention. The method 700 includes supplying the PCB with a power signal (e.g., a 24V power signal) to cycle operation of the motor assembly (block 702). The PCB controller sends a power signal to the motor assembly to begin a cycle operation (block 704), initiating an actuation cycle in the motor assembly using a first motor speed and first current value (block 706), such as a high motor speed with low current (e.g., a motor speed of about 1310 PPS and current of about 700 mA). During the actuation cycle, the microprocessor of the PCB monitors the actuation cycle to determine if a stall is detected during the actuation cycle (block 708) which may prevent proper latch bolt retraction parameters (e.g., a latch retraction time of about 0.5 secs, a predetermined number of motor assembly pulses per second, a current range of about 700 mA to about 1 A, a latch bolt projection from the case of about 0.75 in, etc.). During the initial actuation cycle, the motor assembly operates using a high motor speed which provides finer rotation control of the motor to detect a stall by the microprocessor more readily.

If no stall is detected during stall detection monitoring by the microprocessor (indicating proper latch bolt retraction by the motor assembly using the cycle operation), the controller of the PCB will apply a hold current (e.g., a current of about 50 mA) to the motor assembly to counteract the biasing force applied by resilient member on lever arm and maintain the latch bolt in a fully retracted position (block 716). The power source may subsequently be ceased at the PCB, terminating the cycle operation (block 718). Upon termination, lever arm will be biased to a return position forward the mortise lock rear wall, returning the latch bolt to an extended position and the motor shaft to its position at the motor forward end.

Under conditions in which sealing gaskets of a door frame or pressure differentials from HVAC systems cause improper latch bolt retraction parameters using the first motor speed and current value described above, the motor assembly will require a different operational mode to retract the latch bolt as quickly as possible to avoid unnecessary pulling on the door by an end user prior to complete latch bolt retraction. These increased forces are further compounded by the offset loading of the motor assembly, lever arm, and latch bolt, which can cause stalling of the motor assembly during the actuation process. Detection of a stall signal by the microprocessor indicates failure of one or more latch bolt retraction parameters due to these sideloading or loading forces on the latch bolt.

Upon detection of a motor assembly stall signal by the microprocessor (block 708) while utilizing the initial cycle operation, the microprocessor determines the number of incremental positions completed by the motor assembly prior to the stall signal, thereby calculating the number of incremental positions remaining by the motor assembly to complete latch bolt retraction procedures (block 710). The number of incremental positions of the motor assembly can comprise the number of revolutions or degrees of rotation by the motor, the number of completed step pulses or steps, and the like. Once the number of remaining incremental positions is determined, the microprocessor will signal the controller to initiate a second cycle operation comprising a high force cycle actuation of latch bolt (block 712). The second cycle operation in the motor assembly uses a second motor speed and second current value (block 714), such as a low motor speed with high current (e.g., a motor speed of about 655 PPS and current of about 1 A), so that retraction of the latch bolt may be completed within designated latch bolt retraction parameters (e.g., a latch retraction time of about 0.5 sec to about 1.0 sec, completion of about 25% to 100% of the total number of motor assembly steps, a latch bolt projection from the case of about 0.75 in, etc.). After applying the second cycle operation for the number of incremental positions remaining by the motor assembly, the microprocessor will signal the hold current phase (block 716), until termination of the actuation cycle (block 718). While utilizing the second cycle operation, the motor assembly will exhibit a higher torque output necessary to overcome the increased sideloading or loading forces on the latch bolt. Thus, retraction of the latch bolt is possible without unnecessary pulling on the door by an end user prior to complete latch bolt retraction.

Due to the microprocessor monitoring the detection of a stall signal and determining the number of incremental positions remaining, the present invention advantageously can perform latch bolt actuation by the motor assembly using both low and high torque operational modes to ensure proper latch bolt retraction parameters within the mortise lock regardless of additional side loading forces. Further, malfunctioning of latch bolt operations within the mortise lock is prevented, significantly enhancing the performance and life expectancy of the motor assembly. The method of the present invention may therefore perform actuations on a latch bolt in either a first, high speed, low current operation to ensure proper actuation of the latch bolt under normal operating conditions, and a second low speed, high current operation upon detection of a stall which will ensure proper retraction of a latch bolt using a higher force operation. By utilizing stall detection to determine the amount of load on the door, the present invention may thus adjust the power and speed operations of the motor assembly as necessary to ensure proper actuation and longevity of the motor. The motor assembly of the present invention and method of use accommodate offset loading while maximizing efficiency and wear resistance on the motor assembly within the mortise lock.

Thus, the present invention provides one or more of the following advantages: a motor assembly which may accommodate offset loads while maximizing efficiency and wear resistance; a motor assembly which produces a smaller footprint within a mortise lock; a latching mechanism that is driven to overcome performance issues due to offset loading; and a method and system for controlling the operation of latch actuators and the power applied thereby to latching mechanisms, at different steps of the actuation process.

Although specific embodiments have been illustrated and described herein, those of ordinary skill in the art appreciate that any arrangement which are calculated to achieve the same purpose may be substituted for the specific embodiments shown and that the present disclosure has other applications in other environments. This application is intended to cover any adaptations or variations of the present disclosure. The descriptions provided herein are in no way intended to limit the scope of the present disclosure to the specific embodiments described herein.

Thus, having described the invention, what is claimed is:

1. A motor assembly in combination with a mortise lock, the mortise lock comprising:

a PCB comprising a controller and a microprocessor; and said motor assembly comprising:

a motor;

a shaft translatable within the motor;

an actuation housing forming an actuation housing channel therein; and an actuating element secured to an end of the shaft and moveable within the actuation housing channel, the actuating element including a projection disposed outside the actuation housing and extending normal to a longitudinal axis of the shaft, the actuating element offset from the shaft and coplanar with a lever arm of the mortise lock;

wherein the motor assembly is configured to initiate an initial cycle operation upon receipt of a power signal from the PCB, the initial cycle operation capable of moving a latch bolt of the mortise lock from an extended position to a retracted position wherein a first portion of the latch bolt remains inside a mortise lock case of the mortise lock.

2. The motor assembly in combination with the mortise lock of claim 1, wherein the initial cycle operation comprises a motor speed of about 1310PPS and current of about 700 mA.

3. The motor assembly in combination with the mortise lock of claim 1, wherein the actuation housing comprises a lower housing member and an upper housing member, the lower housing member having a coupling element for engagement with a coupling end of the upper housing member.

4. The motor assembly in combination with the mortise lock of claim 1, wherein the motor assembly further comprises a guide member secured to the end of the shaft and in slidable engagement with the actuation housing channel.

5. The motor assembly in combination with the mortise lock of claim 1, wherein the microprocessor is configured to detect a stall signal as the motor assembly performs the initial cycle operation, the stall signal indicating failure of a latch bolt retraction parameter.

6. The motor assembly in combination with the mortise lock of claim 5, wherein the latch bolt retraction parameter comprises one or more of the following: a latch bolt projection length, a number of motor assembly pulses per second, a current range of about 700 mA to about 1 A, a percentage of total motor assembly steps completed, and a predetermined latch bolt retraction speed.

7. The motor assembly in combination with the mortise lock of claim 5, wherein upon detection of the stall signal the controller causes the motor assembly to perform a second cycle operation to move the latch bolt from the extended position to the retracted position.

8. The motor assembly in combination with the mortise lock of claim 7, wherein the second cycle operation comprises a motor speed less than a motor speed of the initial cycle operation and an electrical current greater than an electrical current of the initial cycle operation.

9. A method of actuating a motor-assisted mortise lock, the method comprising:

identifying, by a microprocessor, a number of incremental positions remaining in an initial cycle operation of a motor assembly when a stall signal is detected during the initial cycle operation indicating failure of a latch bolt retraction parameter;

initiating, by a controller, a second cycle operation of the motor assembly for the number of incremental positions remaining to move a latch bolt from an extended position to a retracted position within the latch bolt retraction parameter; and applying a holding current to the motor assembly to maintain the latch bolt in the retracted position;

wherein the second cycle operation of the motor assembly comprises a motor speed less than a motor speed of the initial cycle operation and an electrical current greater than an electrical current of the initial cycle operation.

10. The method of claim 9, wherein the latch bolt retraction parameter comprises one or more of the following: a latch bolt projection length, a number of motor assembly pulses per second, a current range of about 700 mA to about 1 A, a percentage of total motor assembly steps completed, and a predetermined latch bolt retraction speed.

11. The method of claim 9, wherein failure of the latch bolt retraction parameter is due to sideloading or loading forces on the latch bolt.

12. The method of claim 9, wherein prior to identifying the number of incremental positions remaining, the method further comprises:

supplying a PCB of the mortise lock with a power signal, the PCB comprising the microprocessor and the controller;

sending the power signal to the motor assembly;

initiating the initial cycle operation of the motor assembly to move the latch bolt toward the retracted position; and monitoring, by the microprocessor, the initial cycle operation to detect the stall signal indicating failure of the latch bolt retraction parameter.

13. A method of operating a motor-assisted mortise lock, the method comprising:

supplying a PCB of the mortise lock with a power signal;

sending the power signal to a motor assembly of the mortise lock, the motor assembly comprising:

a motor;

a shaft translatable within the motor;

an actuation housing forming an actuation housing channel therein; and an actuating element secured to an end of the shaft and moveable within the actuation housing channel, the actuating element including a projection disposed outside the actuation housing and extending normal to a longitudinal axis of the shaft, the actuating element offset from the shaft and coplanar with a lever arm of the mortise lock;

initiating an initial cycle operation of the motor assembly to cause the actuating element to engage the lever arm and move a latch bolt of the mortise lock from an extended position to a retracted position;

monitoring, by a microprocessor, the initial cycle operation to detect a stall signal indicating failure of a latch bolt retraction parameter;

moving the latch bolt from an extended position to a retracted position within the latch bolt retraction parameter; and applying a hold current to the motor assembly to maintain the latch bolt in the retracted position.

14. The method of claim 13, wherein prior to moving the latch bolt from the extended position to the retracted position, the method further comprises:

detecting, by the microprocessor, a stall signal as the motor assembly performs the initial cycle operation, the stall signal indicating failure of the latch bolt retraction parameter;

determining, by the microprocessor, a number of incremental positions remaining in the initial cycle operation; and initiating a second cycle operation of the motor assembly for the number of incremental positions remaining.

15. The method of claim 14, wherein the second cycle operation of the motor assembly comprises a motor speed less than a motor speed of the initial cycle operation and an electrical current greater than an electrical current of the initial cycle operation.

16. The method of claim 13, wherein failure of the latch bolt retraction parameter is due to sideloading or loading forces on the latch bolt.

17. The method of claim 13, wherein the latch bolt retraction parameter comprises one or more of the following: a latch bolt projection length, a number of motor assembly pulses per second, a current range of about 700 mA to about 1 A, a percentage of total motor assembly steps completed, and a predetermined latch bolt retraction speed.

* * * * *